United States Patent [19]

Kowalski

[11] Patent Number: 5,095,503
[45] Date of Patent: Mar. 10, 1992

[54] CELLULAR TELEPHONE CONTROLLER WITH SYNTHESIZED VOICE FEEDBACK FOR DIRECTORY NUMBER CONFIRMATION AND CALL STATUS

[75] Inventor: Joseph L. Kowalski, Fox River Grove, Ill.

[73] Assignee: Motorola, Inc., Schaumburg, Ill.

[21] Appl. No.: 558,046

[22] Filed: Jul. 26, 1990

Related U.S. Application Data

[63] Continuation-in-part of Ser. No. 453,877, Dec. 20, 1989, Pat. No. 5,018,188.

[51] Int. Cl.$^5$ ............................................. H04M 11/00
[52] U.S. Cl. ............................................ 579/59; 379/63; 379/354
[58] Field of Search .................... 379/58, 59, 63, 355, 379/354

[56] References Cited

U.S. PATENT DOCUMENTS

| | | | |
|---|---|---|---|
| 4,698,838 | 10/1987 | Ishikawa et al. | 379/58 |
| 4,731,811 | 3/1988 | Dubus | 379/355 |
| 4,737,976 | 4/1988 | Borth et al. | 379/58 |
| 4,870,686 | 9/1989 | Gerson et al. | 381/43 |
| 4,896,370 | 1/1990 | Kasparian et al. | 379/59 |

FOREIGN PATENT DOCUMENTS

| | | | |
|---|---|---|---|
| 0176104 | 4/1986 | European Pat. Off. | 379/58 |
| 332967 | 2/1985 | Fed. Rep. of Germany | 379/58 |
| 3616368 | 11/1987 | Fed. Rep. of Germany | 379/58 |
| 0023265 | 1/1987 | Japan | 379/59 |
| 0023266 | 1/1987 | Japan | 379/59 |
| 0276353 | 11/1988 | Japan | 379/355 |

Primary Examiner—James L. Dwyer
Assistant Examiner—Dwayne D. Bost
Attorney, Agent, or Firm—Rolland R. Hackbart

[57] ABSTRACT

A unique cellular telephone controller (104 and 106) provides synthesized voice feedback for directory number confirmation, call status, and cellular telephone feature, option and service selection. Cellular telephone (100) includes a cellular telephone transceiver (102), cellular telephone handset (108), AM/FM radio (110), speaker (112), control box (106), and controller switch unit (104). Controller switch unit (104) includes phone switch (201), select switch (202), scroll up switch (203), scroll down switch (204), microphone (210), and preamplifier (211). Activation of the scroll up switch (203) or scroll down switch (204) steps a location counter through locations zero through ten of the telephone number directory in cellular telephone (100) and also voices the location number or name. Activation of the select switch (202) reads out the telephone number from the memory location indicated by the location counter and also voices the digits or name for the read-out telephone number. Activation of the phone switch (201) originates a cellular telephone call to the read-out telephone number. Thereafter, another activation of the phone switch (201) terminates the cellular telephone call.

11 Claims, 7 Drawing Sheets

CELLULAR TELEPHONE CONTROLLER WITH SYNTHESIZED VOICE FEEDBACK FOR DIRECTORY NUMBER CONFIRMATION AND CALL STATUS

RELATED APPLICATIONS

The present invention is related as a continuation-in-part to copending U.S. patent application Ser. No. 453,877, filed Dec. 20, 1989 (now U.S. Pat. No. 5,018,188, granted May 21, 1991), entitled "Microphone-Controller with Multifunction Single Conductor," and assigned to the instant assignee.

BACKGROUND OF THE INVENTION

The present invention is generally related to radiotelephones, and more particularly to a synthesized voice-feedback controller for cellular telephones.

Cellular telephones currently are operated in vehicular applications with a special purpose handset having a keypad with ten numerical keys and one or more function keys. When making a cellular telephone call, it is necessary to pick up the handset, enter the desired telephone number or press a key sequence to recall the desired telephone number from the repertory directory, and press the send key. In order to confirm that the desired telephone number is correct, it is further necessary to review the desired telephone number in the handset display. The foregoing operation requires many actions by the user which are both time consuming and distracting from operation of the vehicle. These problems may be avoided by voice operation of the cellular telephone as shown and described in U.S. Pat. Nos. 4,737,976 and 4,870,686. However, such voice-operated cellular telephones required additional complex and expensive voice recognition circuitry which is rendered inoperable in the presence of large amounts of background noise typically encountered in vehicles. For the foregoing reasons, there is a need for an improved and inexpensive cellular telephone controller with synthesized voice-feedback which is readily accessible and easily operated, thereby freeing the user from the need to use a handset and review desired telephone numbers in the handset display.

OBJECTS OF THE INVENTION

Accordingly, it is an object of the present invention to provide an inexpensive, unique synthesized voice-feedback controller for controlling and operating cellular telephones.

It is another object of the present invention to provide a unique synthesized voice-feedback controller for cellular telephones, which automatically provides synthesized voice feedback for directory number confirmation, call status, and cellular telephone feature, option and service selection.

BRIEF DESCRIPTION OF THE DRAWINGS

FIGS. 3A-3G comprise a flow chart for the process used by microcontroller 221 in FIG. 1 for controlling operation of cellular telephone 100.

DETAILED DESCRIPTION OF THE PREFERRED EMBODIMENT

Figure 1:
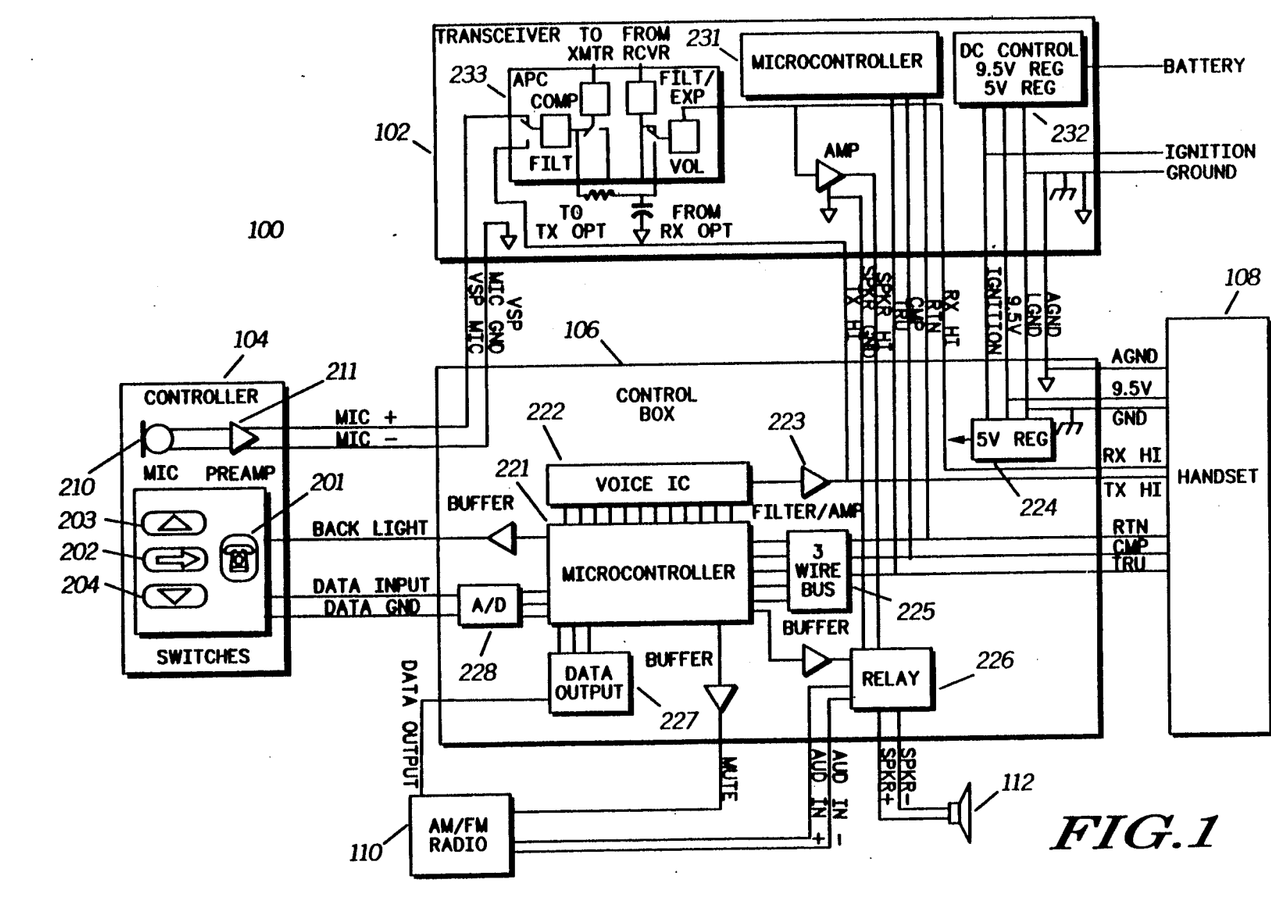
FIG. 1 is a block diagram of a cellular telephone 100 including a synthesized voice-feedback controller 104 and 106, embodying the present invention.

Referring to FIG. 1, there is illustrated a block diagram of a cellular telephone 100 including a synthesized voice-feedback controller 104 and 106, embodying the present invention. Controller switch unit 104 includes phone switch 201, select switch 202, scroll up switch 203, scroll down switch 204 for operating cellular telephone 100. Activation of the scroll up switch 203 or scroll down switch 204 steps a location counter through locations zero through ten of the telephone number directory in cellular telephone 100 and also voices the location number or name. Activation of the select switch 202 reads out the telephone number from the memory location indicated by the location counter and also voices the digits or name for the read-out telephone number. Activation of the phone switch 201 originates a cellular telephone call to the read-out telephone number. Thereafter, another activation of the phone switch 201 terminates the cellular telephone call. Synthesized voice-feedback controller 104 and 106 of the present invention may be advantageously used with any cellular telephone for providing synthesized voice feedback for directory number confirmation, call status, and cellular telephone feature, option and service selection.

Referring to FIG. 1, cellular telephone 100 includes a cellular telephone transceiver 102, cellular telephone handset 108, AM/FM radio 110, speaker 112, control box 106, and controller switch unit 104. Cellular telephone transceiver 102 includes a radio transmitter, a radio receiver, DC control circuitry 232 for generating +5 V and +9.5 V supply voltages, and audio switching circuitry 233, and microcontroller 231 with memory for controlling the operation thereof and storing telephone numbers, features, options, service selections, and other operating information. Audio switching circuitry 233 is shown and described in further detail in U.S. Pat. No. 4,741,018. Transceiver 102 and handset 108 may be any conventional cellular telephone transceiver and associated handset, such as, for example, the transceiver shown and described in Motorola instruction manual number 68P81066E40, entitled "DYNATAC Cellular Mobile Telephone 800 MHZ Transceiver," published by and available from Motorola C & E Parts, 1313 East Algonquin Road, Schaumburg, Ill. 60196. In the preferred embodiment, transceiver 102, handset 108 and control box 106 are coupled to a three-wire data bus for communicating therebetween commands and data according to the signalling protocol shown and described in U.S. Pat. Nos. 4,369,516, 4,616,314, and 4,654,655.

Controller switch unit 104 in FIG. 1 includes phone switch 201, select switch 202, scroll up switch 203, scroll down switch 204, microphone 210, and preamplifier 211. In the hands-free operating mode of cellular telephone 100, voice signals from microphone 210 are coupled by preamplifier 211 to audio switching circuitry 233 for application to the transmitter of transceiver 233. Audio signals from the receiver of transceiver 233 are coupled in the hands-free operating mode by audio switching circuitry 233 to relay 226 for application to speaker 112. Switches 201-204 are coupled by FET switching circuitry to the data input and data ground signals for application to control box 106. Activation of switches 201-204 generates different magnitude data input voltages which are detected in control box 106, as described in further detail hereinbelow for FIGS. 1 and 2.

Control box 106 in FIG. 1 includes voice synthesizer integrated circuit (IC) 222, filter/amplifier 223, +5 V regulator 224, three-wire bus interface circuitry 225, relay 226, data output circuitry 227, analog-to-digital (A/D) converter 228, and microcontroller 221 with memory for controlling the operation thereof. Microcontroller 221 may be any suitable commercially available microcontroller, such as, for example, the Motorola type MC68HC05C8 microcontroller. Voice synthesizer IC 222 generates under control of microcontroller 221 voiced telephone number digits, location numbers, location names, and operating states, which are coupled by filter/amp 223 for application to the earpiece speaker of handset 108 and/or to audio switching circuitry 233 for application to speaker 112. Voice synthesizer IC 222 may be any suitable commercially available synthesizer, such as, for example, the Philips type PCF8200 synthesizer. Microcontroller 221 generates a control signal which is buffered and applied to relay 226 for switching voiced words to speaker 112, as described in further detail hereinbelow for FIG. 3.

A/D converter 228 in FIG. 1 is coupled to data input and data ground signals for converting the voltage thereon to a digital representation thereof. The magnitude of the data input voltage varies depending on which of switches 201-204 is activated. Microcontroller 221 compares the digital representation of the data input voltage from A/D converter 228 to stored predetermined voltage ranges to determine which of switches 201-204 has been activated. A/D converter 228 may be any suitable commercially available A/D converter, such as, for example, the Texas Instruments type TLC549 A/D converter.

Microcontroller 221 in FIG. 1 also controls operation of AM/FM radio 110 in response to activation of switches 201-204. Switches 203 and 204 are activated to adjust AM/FM radio volume up or down, respectively, and switch 202 causes AM/FM radio 110 to tune to the next pre-set radio channel. Microcontroller 221 couples the state of switches 202-204 to AM/FM radio 110 by way of data output circuitry 227, which includes the same FET circuitry illustrated in FIG. 2 for switches 202-204. Microcontroller 221 also generates a mute control signal which is buffered and applied to AM/FM radio 110 for muting it in response to activation of switch 201. When AM/FM radio 110 is on and a cellular telephone call is not in progress, relay 226 couples audio signals from AM/FM radio 110 to speaker 112.

Figure 2:
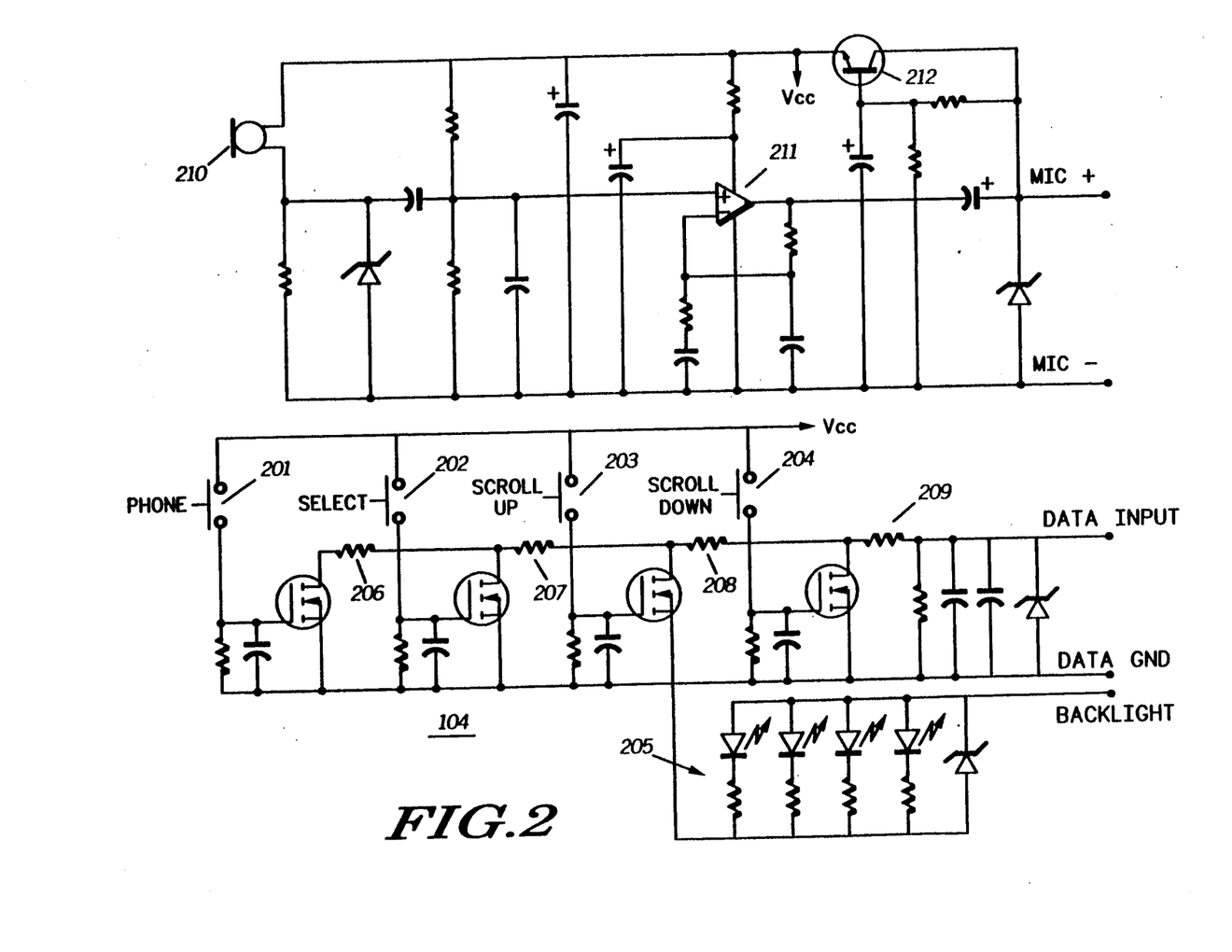
FIG. 2 is a detailed circuit diagram of controller 104 in FIG. 1.

Referring next to FIG. 2, there is illustrated a detailed circuit diagram of controller switch unit 104 in FIG. 1. Switches 201-204 are illuminated by corresponding light emitting diodes 205, which are coupled to the backlight voltage from control box 106. Voice signals from microphone 210 are amplified by preamplifier 211. Transistor regulator 212 generates the +Vcc supply voltage for preamplifier 211 and switches 201-204. When activated, each of switches 201-204 enables a corresponding FET transistor to couple resistors 206-209, respectively, to the data ground signal. That is, when switch 201 is activated resistors 206-209 are coupled in series between the data input and data ground signals; when switch 202 is activated resistors 207-209 are coupled in series between the data input and data ground signals; when switch 203 is activated resistors 208-209 are coupled in series between the data input and data ground signals; and when switch 204 is activated resistor 209 is coupled between the data input and data ground signals. As a result, different voltages are applied to the data input signal by the voltage divider formed by a resistor to +5 V on the data input signal in control box 106 and resistors 207-209.

Referring next to FIG. 3, there is illustrated a flow chart for the process used by microcontroller 221 in FIG. 1 for controlling operation of cellular telephone 100. Entering FIG. 3A at block 301, the process for the non-phone mode (handset 108 is not in use) proceeds to decision block 303, where a check is made to determine if the phone switch 201 has been activated. Switching between the phone mode and non-phone mode is controlled by initial activation of the phone switch 201. If not, NO branch is taken to wait. If phone switch 201 has been activated, YES branch is taken from decision block 303 to decision block 305, where a check is made to determine if the phone switch 201 has been activated and held for greater than one second. If so, YES branch is taken to entry point F in FIG. 3D. If not, NO branch is taken to block 307, where microcontroller 221 resets its memory location counter to zero and enables voice synthesizer IC 222 to voice "LOCATION PLEASE" if cellular telephone 100 in not electronically locked. If cellular telephone 100 is roaming in another cellular telephone system, voice synthesizer IC 222 is enabled to voice "ROAMING" and program control exits to other tasks. If cellular telephone 100 is electronically locked, voice synthesizer IC 222 is enabled to voice "PHONE LOCKED" and program control exits to other tasks.

Figure 3A:
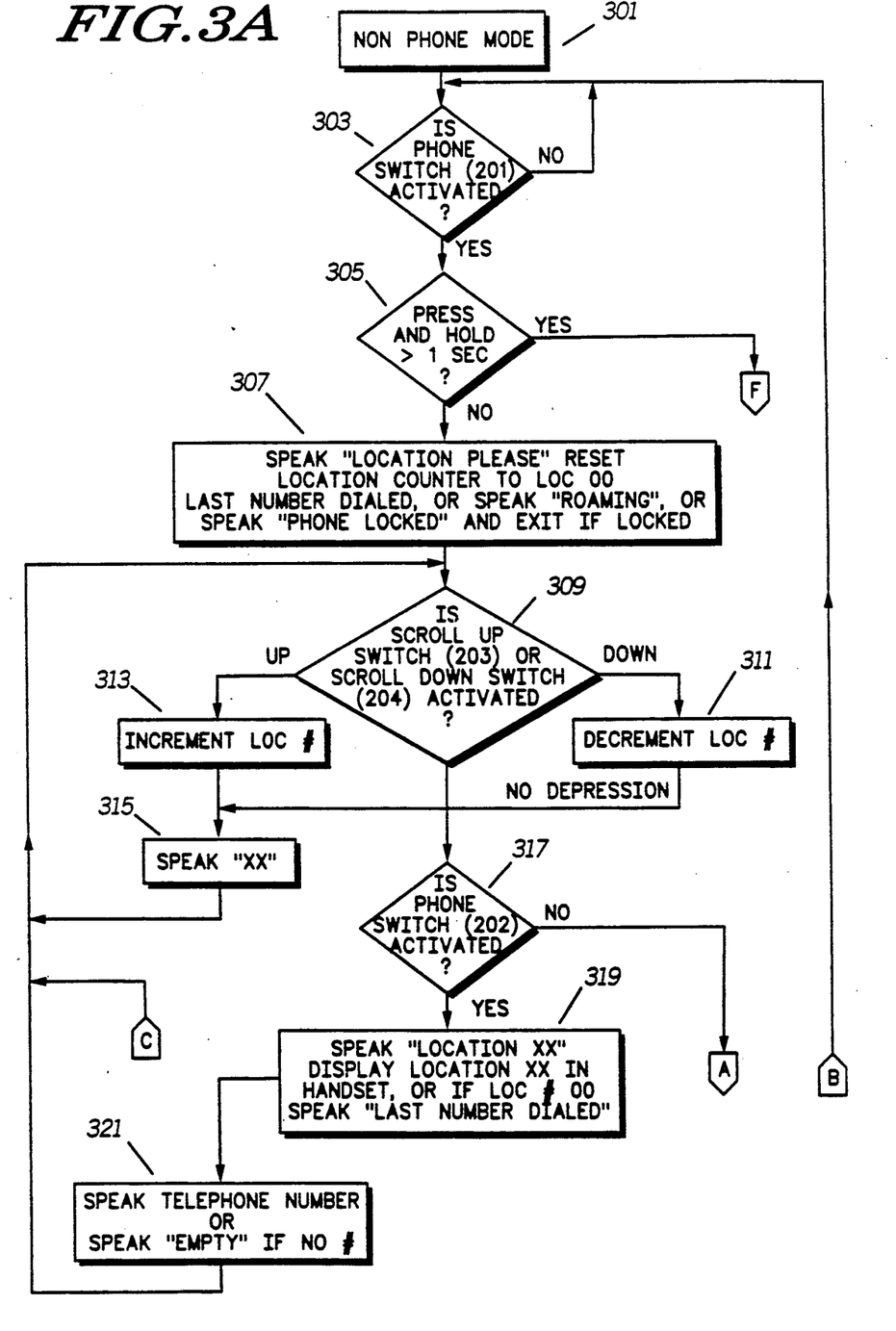

Next, at decision block 309 in FIG. 3A, a check is made to determine if the scroll up switch 203 or the scroll down switch 204 has been activated. In the preferred embodiment, the scroll up and scroll down switches 203 and 204 step through memory locations zero through ten of the telephone number directory in cellular telephone 100. In other embodiments, the scroll up and scroll down switches 203 and 204 may step through all memory locations or different ten-number banks of the telephone number directory in cellular telephone 100. If scroll up switch 203 has been activated, UP branch is taken from decision block 309 to block 313 where the location counter is incremented by one. If scroll down switch 204 has been activated, DOWN branch is taken from decision block 309 to block 311 where the location counter is decremented by one. Next, at block 315, voice synthesizer IC 222 is enabled to voice the location number or location name indicated by the location counter, such as, for example, "ONE" or "HOME" and program control returns to decision block 309. If the scroll up switch 203 or the scroll down switch 204 have not been activated, NO branch is taken from decision block 309 to decision block 317, where a check is made to determine if the select switch 202 has been activated.

Figure 3B:
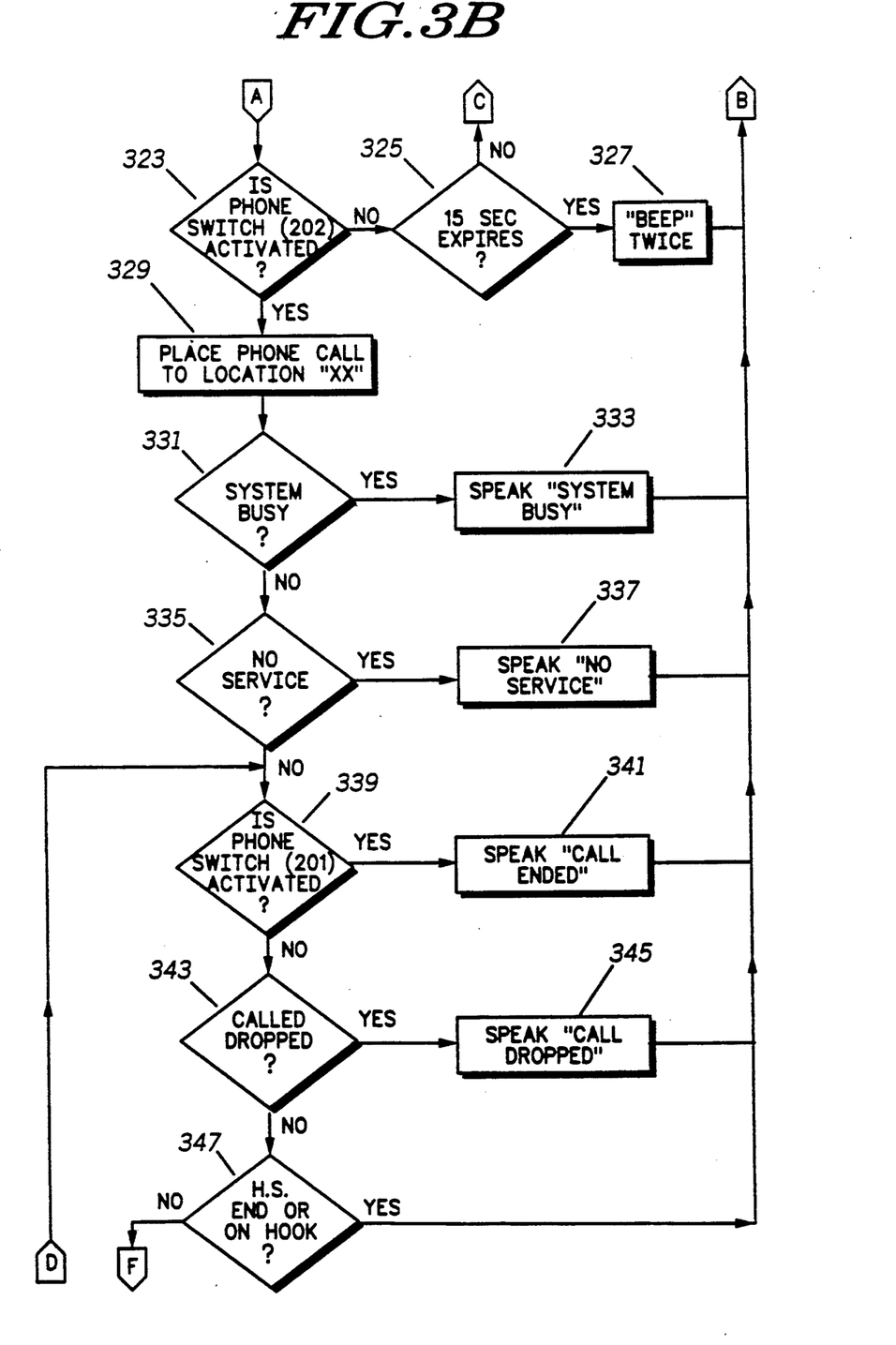

If the select switch 202 has not been activated in FIG. 3A, NO branch is taken from decision block 317 to entry point A in FIG. 3B. If the select switch 202 has been activated, YES branch is taken from decision block 317 to block 319, where microcontroller 221 reads the telephone number from the memory location indicated by the location counter and enables voice synthesizer IC 222 to voice the digits or name for the read-out telephone number, such as, for example, "LOCATION ONE" followed by "FIVE, FIVE, FIVE, ONE, TWO, ONE, TWO" or "HOME". If the location counter is set to location zero, voice synthesizer IC 222 is enabled to voice "LAST NUMBER DIALED". Next, at block 321, the digits of the read-out telephone number are voiced by voice synthesizer IC 222. If the read-out memory location is empty, voice synthesizer IC 222 is enabled to voice "LOCATION TWO" followed by "EMPTY". Thereafter, program control returns to decision block 309.

Entering FIG. 3B at entry point A, program control proceeds to decision block 323, where a check is made to determine if the phone switch 201 has been activated. If not, NO branch is taken to decision block 325 to check if fifteen seconds has elapsed. If not, NO branch is taken to exit point C to return to decision block 309 in FIG. 3A. If fifteen seconds has elapsed, YES branch is taken to block 327 where voice synthesizer IC 222 is enabled to "beep" twice, and thereafter program control proceeds to exit point B to return to decision block 303 in FIG. 3A.

Returning to decision block 323 in FIG. 3B, if the phone switch 201 has been activated, YES branch is taken to decision block 329, where microcontroller 221 originates a cellular telephone call to the read-out telephone number. Next, at decision block 331, a check is made to determine if the cellular telephone system is busy. If so, YES branch is taken to block 333 where voice synthesizer IC 222 is enabled to voice "SYSTEM BUSY", and thereafter program control proceeds to exit point B to return to decision block 303 in FIG. 3A. If the cellular telephone system is not busy, NO branch is taken to decision block 335, where a check is made to determine if no service is available in the cellular telephone system. If so, YES branch is taken to block 337 where voice synthesizer IC 222 is enabled to voice "NO SERVICE", and thereafter program control proceeds to exit point B to return to decision block 303 in FIG. 3A. If service is available in the cellular telephone system, NO branch is taken to decision block 339, where a check is made to determine if the phone switch 201 has been activated. If so, YES branch is taken to block 341 where microcontroller 221 terminates the call in process and enables voice synthesizer IC 222 to voice "CALL ENDED", and thereafter program control proceeds to exit point B to return to decision block 303 in FIG. 3A. If the phone switch 201 has not been activated, NO branch is taken to decision block 343, where a check is made to determine if the call has been dropped by the cellular telephone system (e.g., indicated by a loss of supervisory audi tome). If so, YES branch is taken to block 345 where microcontroller 221 terminates the call in process and enables voice synthesizer IC 222 to voice "CALL DROPPED", and thereafter program control proceeds to exit point B to return to decision block 303 in FIG. 3A. If the call has not been dropped by the cellular telephone system, NO brance is taken to decision block 347, where a check is made to determine if the end or on-hook keys on handset 108 have been activated. If so, YES branch is taken to block 341 where microcontroller 221 terminates the call in process, and thereafter program control proceeds to exit point B to return to decision block 303 in FIG. 3A. If the end or on-hook keys on handset 108 have not been activated, NO branch is taken to entry point E in FIG. 3C.

Figure 3C:
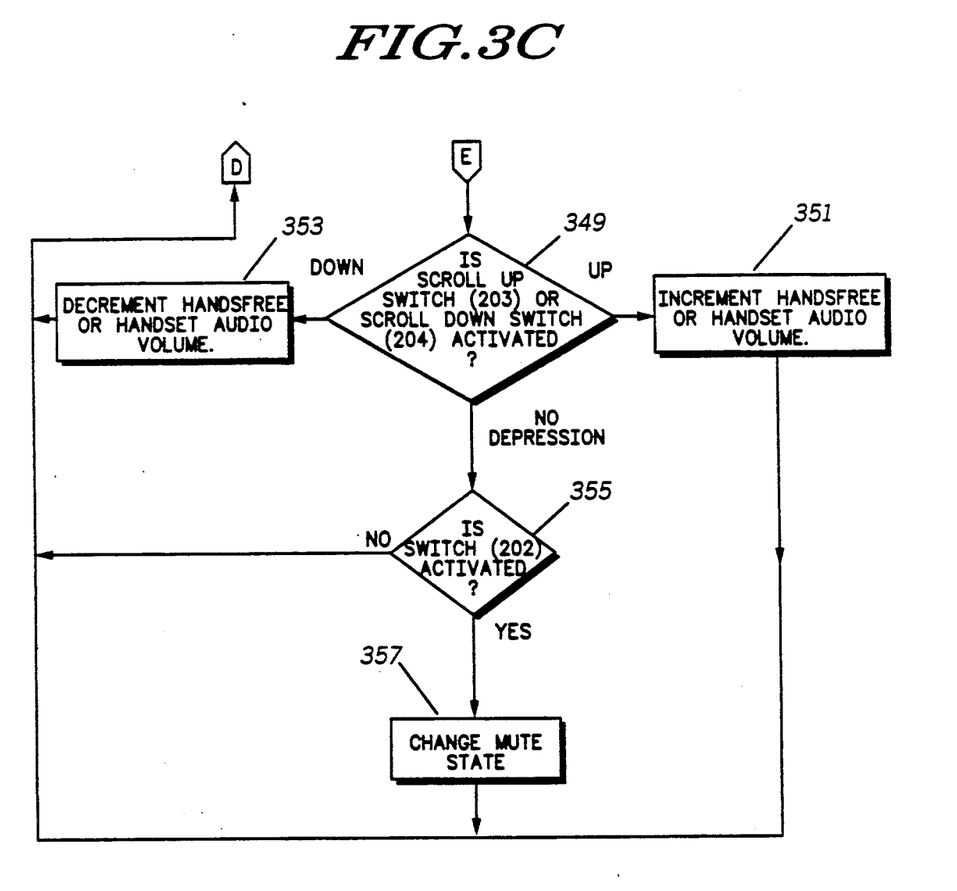

Entering FIG. 3C at entry point E, program control proceeds to decision block 349, where a check is made to determine if the scroll up switch 203 or the scroll down switch 204 has been activated. At this point, the cellular telephone call is still in process. If scroll up switch 203 has been activated, UP branch is taken to block 351 where the hands-free or handset audio volume is incremented by one step. If scroll down switch 204 has been activated, DOWN brance is taken to block 353 where the hands-free or handset audio volume is decremented by one step. If the scroll up switch 203 or the scroll down switch 204 have not been activated, NO brance is taken from decision block 349 to decision block 355, where a check is made to determine if the select switch 202 has been activated. If so, YES branch is taken to block 357, where the mute state is changed. When the mute state is enabled, voice signals from microphone 210 or the handset microphone are muted. If the select switch 202 has not been activated, NO branch is taken from decision block 335 to exit point D, and program control also proceeds from blocks 351, 353 and 357 to exit point D to return to decision block 339 in FIG. 3B.

Figure 3D:
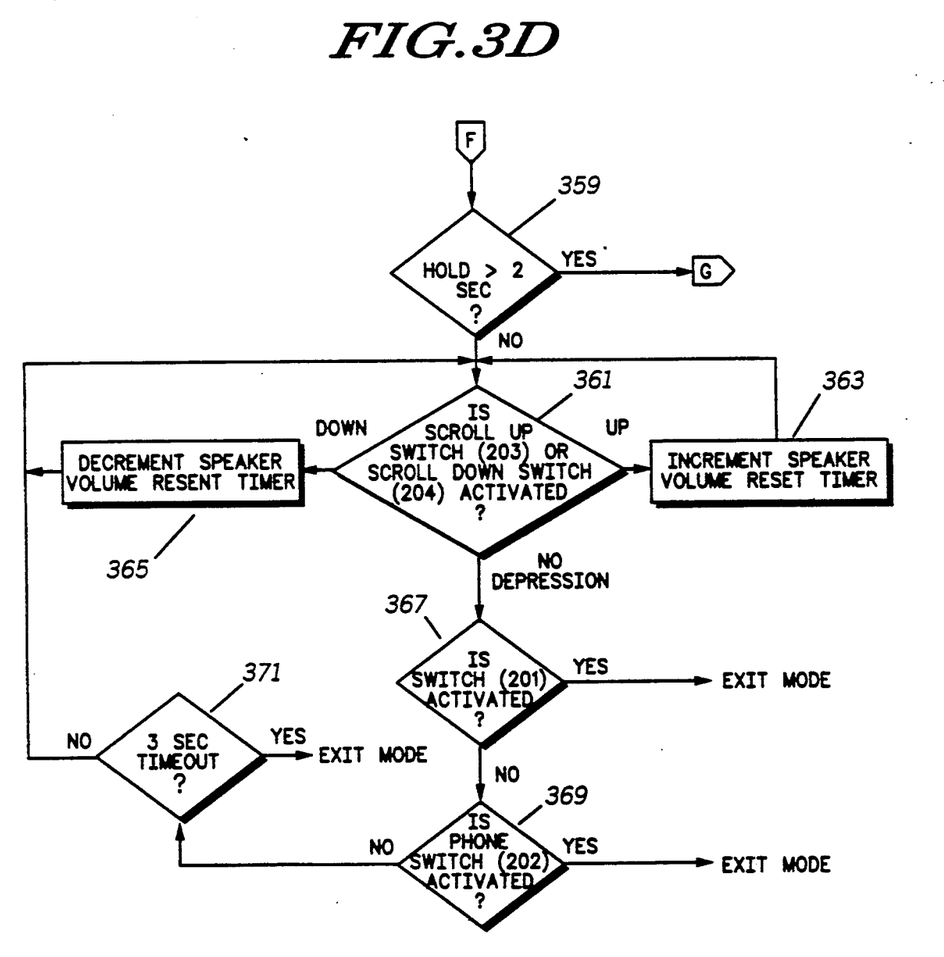

Entering FIG. 3D at entry point F, program control proceeds to decision block 359, where a check is made to determine if the phone switch 201 has been activated and held for greater than two seconds. If so, YES branch is taken to exit point G to transfer to FIG. 3E. If not, NO branch is taken to decision block 361, where a check is made to determine if the scroll up switch 203 or the scroll down switch 204 has been activated. If scroll up switch 203 has been activated, UP branch is taken to block 363 where the speaker volume is incremented by one step. If scroll down switch 204 has been activated, DOWN branch is taken to block 365 where the speaker volume is decremented by one step. After the speaker volume has been changed in blocks 363 and 365, program control proceeds back to decision block 361. If the scroll up switch 203 or the scroll down switch 204 have not been activated, NO branch is taken from decision block 361 to decision block 367, where a check is made to determine if the select switch 202 has been activated. If so, YES branch is taken to exit from the current mode. If the select switch 202 has not been activated, NO branch is taken from decision block 367 to decision block 369, where a check is made to determine if the phone switch 201 has been activated. If so, YES branch is taken to exit from the current mode. If the phone switch 201 has not been activated, NO branch is taken from decision block 369 to decision block 371, where a check is made to determine if a three second timer has elapsed. If so, YES branch is taken to exit from the current mode. If the three second timer has not elapsed, NO branch is taken back to decision block 361.

Figure 3E:
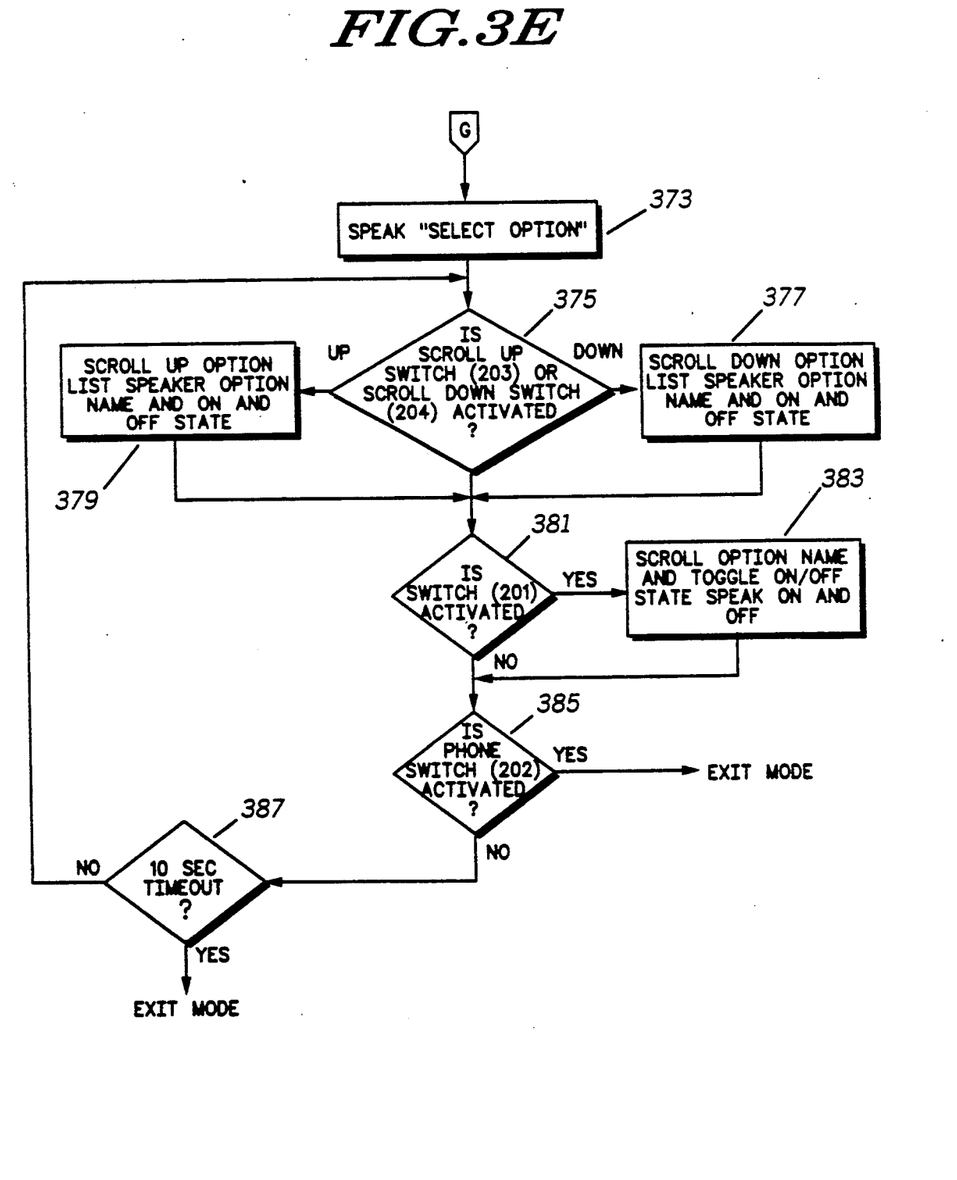

Entering FIG. 3E at entry point G, program control proceeds to decision block 373, where voice synthesizer IC 222 is enabled to voice "SELECT OPTION". Next, at decision block 375, where a check is made to determine if the scroll up switch 203 or the scroll down switch 204 has been activated. If scroll up switch 203 has been activated, UP branch is taken to block 379 where the option list is incremented by one step, and voice synthesizer IC 222 is enabled to voice the next option name. If scroll down switch 204 has been activated, DOWN branch is taken to block 377 where the option list is decremented by one step, and voice synthesizer IC 222 is enabled to voice the previous option name. If the scroll up switch 203 or the scroll down switch 204 have not veen activated, NO branch is taken from decision block 375 to decision block 381, where a check is made to determine if the select switch 202 has been activated. If so, YES branch is taken to block 383 where voice synthesizer IC 222 is enabled to voice the next option name and the on/off state of the option is switched. If the select switch 202 has not been activated, NO branch is taken from decision block 381 to decision block 385, where a check is made to determine if the phone switch 201 has been activated. If so, YES branch is taken to exit from the current mode. If the phone switch 201 has not been activated, NO branch is taken from decision block 385 to decision block 387, where a check is made to determine if a ten second timer has elapsed. If so, YES branch is taken to exit from the current mode. If the ten second timer has not elapsed, NO branch is taken back to decision block 375.

In summary, a unique synthesized voice-feedback controller for cellular telephones has been described which automatically provides synthesized voice feedback for directory number confirmation, call status, and cellular telephone feature, option and service selection. The novel controller may be located on the steering wheel, in a console, in the back seat, or in other readily accessible locations in vehicular and other suitable applications, and is easily and reliably operated, thereby freeing the user from the need to use a handset to dial desired telephone numbers and review desired telephone numbers in the handset display.

I claim:

1. A method for controlling a cellular telephone with voice-feedback control means including first, second, and third control switch means, said cellular telephone including cellular transceiver means operable on cellular radio channels for originating and receiving cellular telephone calls, dialing means with at least ten numerical digits for entering telephone numbers, memory means for storing a plurality of telephone numbers of one or more digits at corresponding locations therein, and synthesizing means for voicing telephone number digits, location numbers or location names, and operating states, and the cellular telephone further being coupled to the first, second, and third control switch means, said method comprising the steps of:

scrolling the locations of said memory means and voicing the location number or location name of the scrolled location, in response to each activation of the first control switch means;

voicing the digits of the telephone number stored at the scrolled location, in response to activation of the second control switch means; and originating a cellular telephone call in response to activation of the third control switch means.

2. The method according to claim 1, wherein said cellular telephone is further coupled to fourth switch means, said method further including the step of:

reverse scrolling the locations of said memory means and voicing the location number or location name of the scrolled location, in response to each activation of the fourth switch means.

3. The method according to claim 1, wherein said cellular telephone further includes display means for displaying telephone number digits, said method further including the step of:

displaying the digits of the telephone number stored at the scrolled location, in response to activation of the second switch means.

4. The method according to claim 1, wherein said cellular telephone further includes display means for displaying location numbers or location names, said method further including the step of:

displaying the location number or location name of tghe scrolled location, in response to activation of the first switch means.

5. A method for controlling a cellular telephone with voice-feedback control means including first, second, third, and fourth control switch means, said cellular telephone including cellular transceiver means operable on cellular radio channels for originating and receiving cellular telephone calls, a handset with at least ten numerical digits for entering telephone numbers, memory means for storing a plurality of telephone numbers of one or more digits at corresponding locations therein, and synthesizing means for voicing telephone number digits, location numbers or location names, and operating states, and the cellular telephone further being coupled to the first, second, third, and fourth control switch means, said method comprising the steps of:

scrolling the locations of said memory means and voicing the location number or location name of the scrolled location, in response to each activation of the first control switch means;

reverse scrolling the locations of said memory means and voicing the location number or location name of the scrolled location, in response to each activation of the fourth control switch means;

voicing the digits of the telephone number stored at the scrolled location, in response to activation of the second control switch means; and originating a cellular telephone call in response to activation of the third control switch means.

6. The method according to claim 5, wherein said cellular telephone further includes display means for displaying telephone number digits, said method further including the step of:

displaying the digits of the telephone number stored at the scrolled location, in response to activation of the second switch means.

7. The method according to claim 5, wherein said cellular telephone further includes display means for displaying location numbers or location names, said method further including the step of:

displaying the location number or location name of the scrolled location, in response to activation of the first switch means.

8. Cellular telephone apparatus, comprising in combination:

a cellular telephone compising:

dialing means for dialing digits of telephone numbers;

cellular transceiver means operable on cellular radio channels for originating and receiving cellular telephone calls;

memory means for storing a plurality of telephone numbers of one or more digits at corresponding locations therein; and data bus means having first and second ports, the first port being coupled to said cellular transceiver means; and voice-feedback control means coupled to the first port of said data bus means for accessing said memory means and originating cellular telephone calls, said voice-feedback control means including:

synthesizing means for voicing telephone number digits, location numbers or location names, and operating states;

first, second, and third control switch means; and processing means coupled to the first, second, and third control switch means for scrolling the locations of said memory means and voicing the location number or location name of the scrolled location in response to each activation of the first control switch means, voicing the digits of the telephone number stored at the scrolled location in response to activation of the secon control switch means, and originating a cellular telephone call in response to activation of the third control switch means.

9. The cellular telephone apparatus according to claim 8, wherein said voice-feedback control means further includes fourth control switch means, said processing means couopled to the fourth control switch means for reverse scrolling the locations of said memory means and voicing the location number or stored location name of the scrolled location, in response to each activation of the fourth control switch means.

10. Cellular telephone apparatus, comprising in combination:
 a cellular telephone comprising:
  a handset having dialing means for dialing digits of telephone numbers and display means for displaying telephone number digits, location number or location names;
  cellular transceiver means operable on cellular radio channels for originating and receiving cellular telephone calls;
  memory means for storing a plurality of telephone numbers of one or more digits at corresponding location therein; and
  data bus means having first and second ports, the first port being coupled to said cellular transceiver means; and
 voice-feedback control means coupled to the first port of said data bus means for accessing said memory means and origninating cellular telephone calls, said voice-feedback control means including:
  synthesizing means for voicing telephone number digits, location numbers of location names, and operating states;
  first, second, and third control switch means; and
  processing means coupled to the first, second, and third control switch means for scrolling the location of said memory means and voicing and displaying the location number or location name of the scrolled location in response to each activation of the first switch control means, voicing and displaying the digits of the telephone number stored at the scrolled location in response to activation of the second control switch means, and originating a cellular telephone call in response to activation of the third control switch means.

11. The cellular telephone according to claim 10, wherein said voice-feedback control means further includes fourth control switch means, said processing means coupled to the fourth control switch means for reverse scrolling the locations of said memory means and voicing the location number or stored location name of the scrolled location, in response to each activation of the fourth control switch means.

* * * * *

UNITED STATES PATENT AND TRADEMARK OFFICE
CERTIFICATE OF CORRECTION

PATENT NO. : 5,095,503
DATED : March 10, 1992
INVENTOR(S) : Joseph L. Kowalski It is certified that error appears in the above-identified patent and that said Letters Patent is hereby corrected as shown below:

In column 7, line 65, change the word "tghe" to --the--.

In column 9, line 1, change the word "secon" to --second--.

In column 9, line 8, change the word "couopled" to --coupled--.

In column 10, line 6, change the word "of" to --or--.

In column 10, lines 10-11, change the word "location" to --locations--.

Signed and Sealed this

Twenty-fifth Day of May, 1993

Attest:

MICHAEL K. KIRK

Attesting Officer  Acting Commissioner of Patents and Trademarks